Sept. 1, 1964

R. B. NAWMAN 3,146,891

FOLDING TRAY CONSTRUCTION

Filed Feb. 20, 1961

INVENTOR.
Rollie B. Nawman
BY
Attorneys

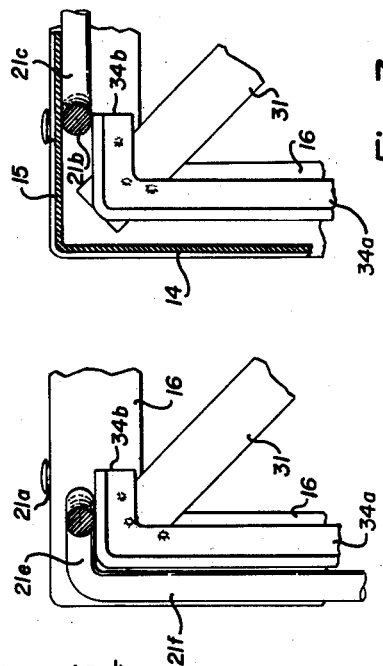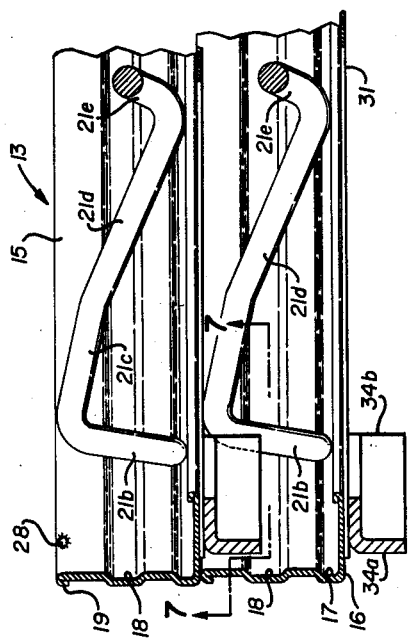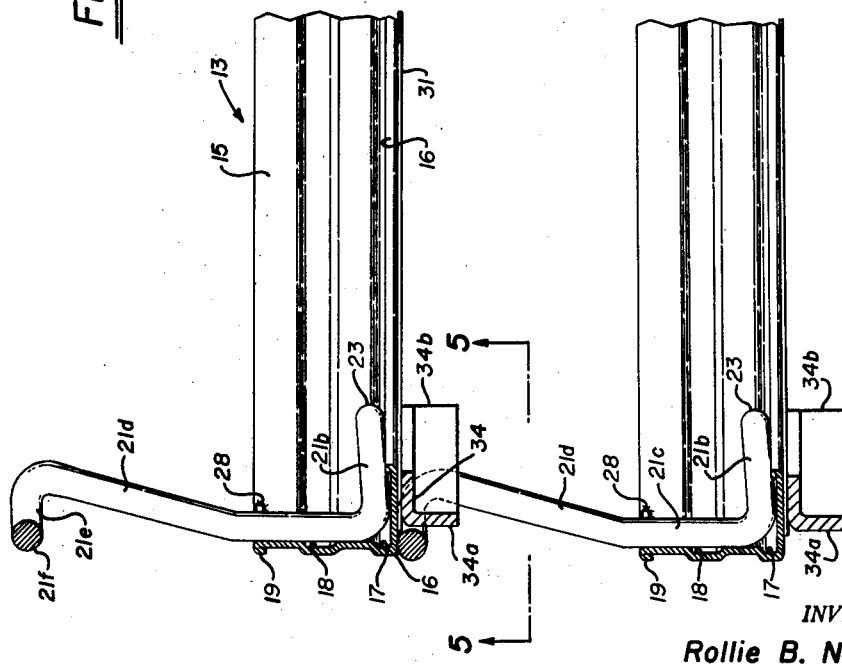

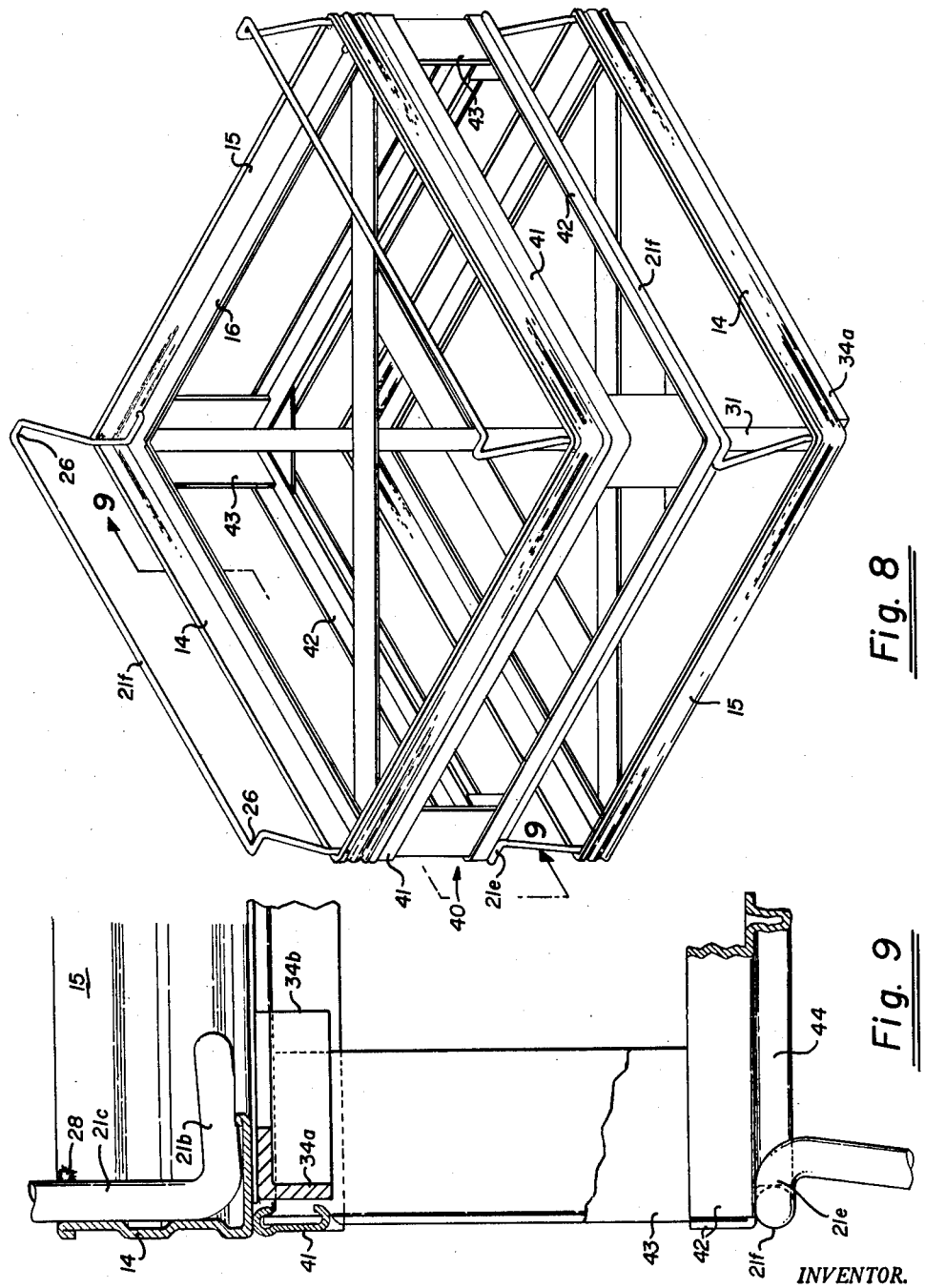

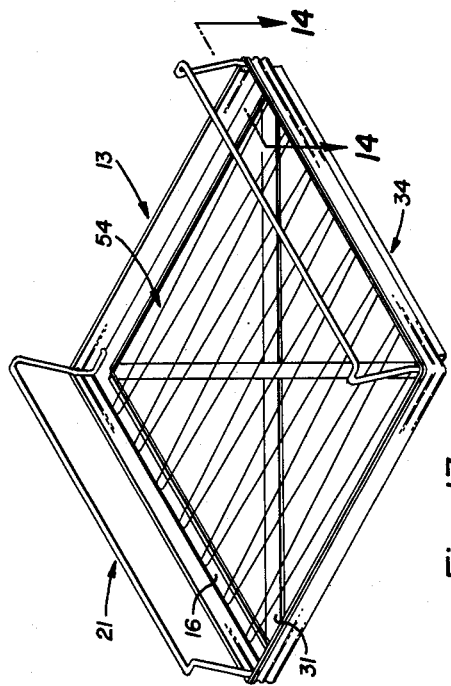
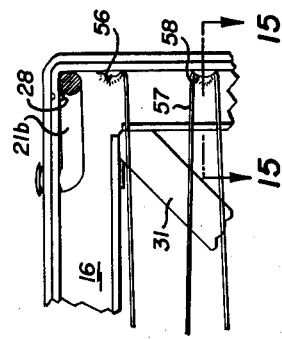
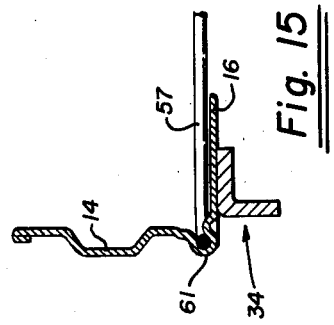
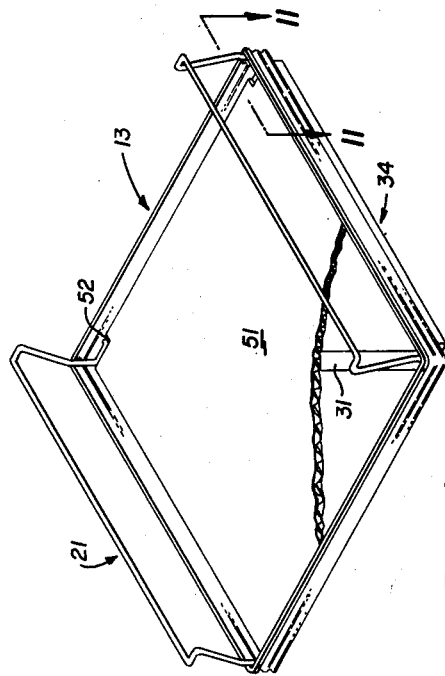
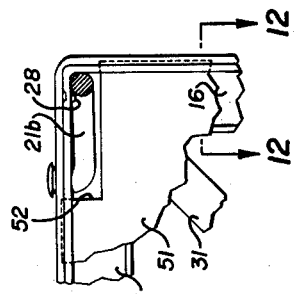
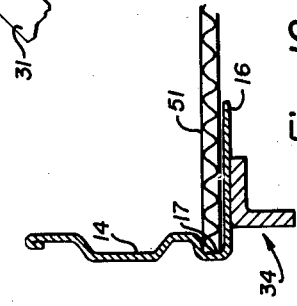

Sept. 1, 1964   R. B. NAWMAN   3,146,891
FOLDING TRAY CONSTRUCTION
Filed Feb. 20, 1961   5 Sheets-Sheet 5
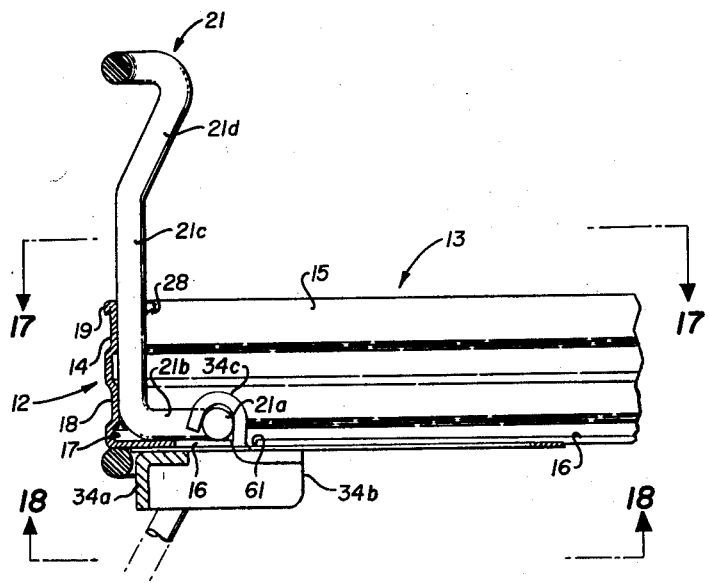
Fig. 16
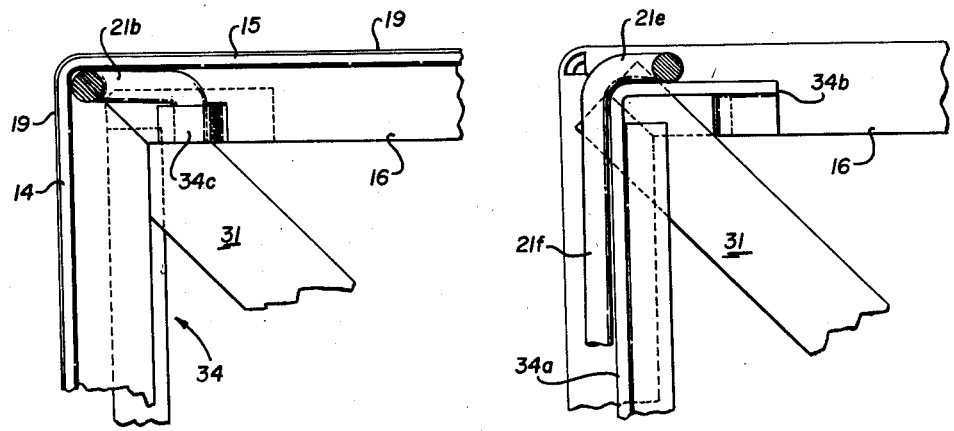
Fig. 17
Fig. 18
INVENTOR.
Rollie B. Nawman
BY
Attorneys

United States Patent Office 3,146,891
Patented Sept. 1, 1964

3,146,891
FOLDING TRAY CONSTRUCTION
Rollie B. Nawman, Piedmont, Calif., assignor to Benner-Nawman, Inc., Oakland, Calif., a corporation of California
Filed Feb. 20, 1961, Ser. No. 90,453
10 Claims. (Cl. 211—126)

This invention relates to a folding tray construction, and more particularly to a folding tray construction particularly adapted for carrying loaves of bread and the like.

Folding trays heretofore provided have not been completely satisfactory. In particular, the construction of the trays has been such that it has been difficult to remove the bails from an upright position to a folded position. In addition, such trays have been relatively expensive because of the high cost of construction. There is, therefore, a need for a new and improved folding tray.

In general, it is an object of the present invention to provide a folding tray construction which is relatively simple and inexpensive to manufacture.

Another object of the invention is to provide a construction in which the bails can be readily moved from an upright position to a folded position and from a folded position, to an upright position.

Another object of the invention is to provide a folding tray construction of the above character in which the trays can be stacked one above the other with the bails in an upright position and also with the bails in a folded position.

Another object of the invention is to provide a folding tray construction of the above character which, because of its construction, makes possible a tray having smaller overall dimensions than conventional trays which still has the same capacity as conventional trays.

Another object of the invention is to provide a folding tray construction of the above character which requires less space.

Another object of the invention is to provide a folding tray construction of the above character which can be utilized with conventional trays.

Additional objects and features of the invention will appear from the following description in which the preferred embodiments have been set forth in conjunction with the accompanying drawings.

Referring to the drawings:

FIGURE 4 is a partial side elevational view in cross-section of a pair of trays stacked one above the other with the bails in an upright position.

FIGURE 5 is a partial cross-sectional view taken along the line 5—5 of FIGURE 4.

FIGURE 6 is a partial side elevational view in cross section of a pair of trays stacked one above the other with the bails in a folded position.

FIGURE 7 is a partial cross-sectional view taken along the line 7—7 of FIGURE 6.

FIGURE 8 is an isometric view showing the utilization of my trays with a conventional tray.

FIGURE 9 is a partial cross-sectional view taken along the line 9—9 of FIGURE 8.

FIGURE 10 is an isometric view of my tray with a liner mounted therein.

FIGURE 11 is a cross-sectional view taken along the line 11—11 of FIGURE 10.

FIGURE 12 is a cross-sectional view taken along the line 12—12 of FIGURE 11.

FIGURE 13 is an isometric view of another embodiment of my folding tray construction.

FIGURE 14 is a cross-sectional view taken along the line 14—14 of FIGURE 13.

FIGURE 15 is a cross-sectional view taken along the line 15—15 of FIGURE 14.

FIGURE 16 is a cross-sectional view of still another embodiment of my folding tray construction.

FIGURE 17 is a top plan view looking along the line 17—17 of FIGURE 16.

FIGURE 18 is a bottom plan view looking along the line 18—18 of FIGURE 16.

Figure 1:
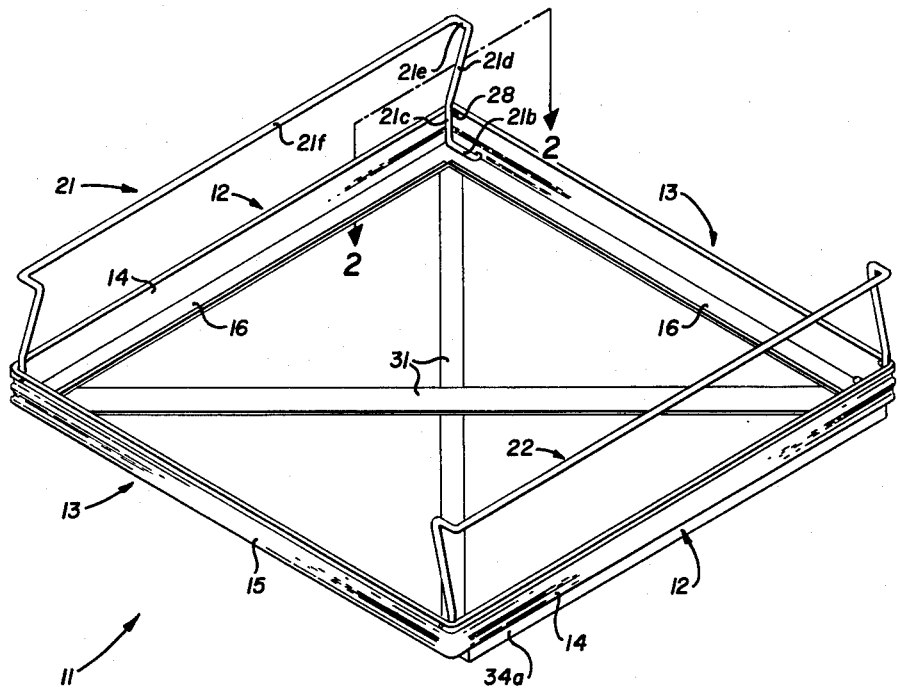
FIGURE 1 is an isometric view of a folding tray incorporating my invention.

In general, my folding tray construction consists of a framework having two side walls and two end walls. The framework also includes a bottom wall portion which extends completely around the framework. A pair of substantially U-shaped bails are pivotally mounted in the side walls of the framework and are movable between upright and folded positions. Each of the bails is provided with portions on opposite ends thereof which are adapted to rest upon the bottom wall portion of the framework and against the end wall when the bail is in an upright position. The portions engaging the bottom wall portion have a length so that when the bail is in a folded position, the upper extremities of these portions are substantially flush with the upper edges of the side walls. Upper portions of each bail are first inclined inwardly from the end walls and then outwardly toward the end walls. A horizontal portion on each bail joins the ends of the bail to form right angle recesses to receive runner-like guide means provided on the bottom of the tray above so that the trays can be stacked one above the other with the bails in an upright position. The guide means on the bottom of the tray are also positioned so that they are adapted to fit within the framework of the tray below when the bails are in a folded position.

More in particular, my folding tray construction shown in FIGURES 1-9 of the drawings consists of a generally rectangular framework 11 having a pair of ends 12 and a pair of sides 13 formed by spaced parallel vertical end walls 14 and spaced parallel vertical side walls 15. The framework 11 can be formed of any suitable material such as cold rolled steel. As can be seen from the drawing, the ends and sides 12 and 13 are formed from the same material and have the same general configuration. As also can be seen particularly from FIGURE 4, the ends and sides are also provided with inwardly extending bottom wall portions 16 which lie in a generally horizontal plane and extend at right angles to the vertical walls 14 and 15.

A horizontal groove 17 is formed in the vertical walls 14 and 15 immediately adjacent the bottom wall portions 16 and extends around the side and end walls. Another horizontal groove 18 is formed in the side and end walls intermediate the upper and lower extremities of the same and serves to reinforce the side walls. The upper extremities of the side and end walls are provided with outwardly and downwardly turned lips 19 to provide upper extremities for the vertical walls having rounded upper surfaces. From the foregoing description, it can be seen that the ends and sides 12 and 13 of the framework 11 can be formed from a single strip of material.

A pair of substantially U-shaped carrying bails 21 and 22 formed of a rod-like material have their lower extremities pivotally mounted in holes 23 in the vertical walls of the side walls 15 at a position which is in substantial abutment with the inwardly extending bottom portions 16 of the side walls. As can be seen particularly from FIGURE 3, the lower extremities of each bail are provided with portions 21a which extend at right angles to the vertical side walls 15 and lie in a horizontal plane. The portions 21a have a length which is slightly greater than the thickness of the vertical walls 14 to permit a slight lateral shifting of the portions 21a for a purpose hereinafter described. The outer extremities of the portions 21a are flattened and rounded as shown in the drawings to prevent the portions 21a from slipping out of the holes 23 provided in the vertical walls 15. It will be noted that the holes 23 are provided in the vertical walls 15 a substantial distance from the end walls 14 for a purpose hereinafter described.

Each extremity of each bail 21 is provided with a portion 21b which extends at right angles to the portion 21a and lies in the same plane as the portion 21a. When the bail 21 is in an upright position, the portions 21b incline downwardly slightly and rest upon the inwardly extending bottom portion 16 as shown particularly in FIGURE 2. When the bail is in a folded position, the portions 21b are in a substantially vertical position. The portions 21b have such a length that when the bails are in a folded position, the upper extremities of the portions 21b are substantially flush with the upper extremities of the adjacent side walls as shown particularly in FIGURE 6. It will be noted that the hole 23 is positioned so that when the bail is in a vertical position, the extremity of the portion 21b remote from the hole substantially abuts the adjacent end wall 12. Each extremity of the bail is also provided with a portion 21c which extends at almost a right angle to the portion 21b so that when the bail is in an upright position, the portions 21c are in a substantially vertical position adjacent the end wall 14. When the bail is in a folded position, the portions 21c incline slightly downwardly from the upper edges of the side walls as shown particularly in FIGURE 6.

The extremities of each of the bails are also provided with portions 21d. When the bail is in an upright position, the portions 21d incline inwardly from ends 12 of the framework and when the bail is in the folded position, incline downwardly at a slightly greater angle than portion 21c as shown in FIGURE 6. The opposite ends of the bail are also provided with portions 21e which, when the bail is in an upright position, extend outwardly toward the adjacent end of the framework and which, when the bail is in a folded position, extends upwardly.

Each of the bails 21 also includes a cross or connecting portion 21f which lies in a substantially horizontal plane. When the bail is in an upright position, it lies in the same vertical plane as the associated end wall. When the bail is in a folded position, it lies in a horizontal plane spaced a slight distance above the bottom portions 16. The portions 21f and 21e form a pair of right angle recesses 26 for receiving portions of a tray above as hereinafter described.

Although it is not absolutely necessary, additional means is provided for holding the bails in an upright position and consists of projections 28 formed on the vertical side walls 15 adjacent the upper extremities of the same. The projections 28 are positioned in such a manner that they are adapted to engage the portions 21c of the bails 21 to hold the bails in an upright position as shown particularly in FIGURE 2. The projections 28 are formed in a suitable manner such as by providing dimples 28a in the vertical walls 14 as shown particularly in FIGURE 2.

It is readily apparent that the bails can be moved to a folded position from the upright position merely by pushing inwardly on both bails with both hands and causing the same to ride over the abutments. As will be noted from FIGURE 2, there is a slight clearance provided on the portions 21a so that the outer extremities of the bails can be urged inwardly to facilitate clearing the abutments 28 if this is necessary.

A pair of cross braces 31 extending diagonally within the framework 11 are secured to opposite corners of the framework 11 by securing them to the bottom sides of the bottom portions 16 by suitable means such as spot welding. The cross braces serve to strengthen the tray and, in addition, serve as support for a liner which may be placed in the tray as hereinafter described.

A runner 34 is provided at each end of the tray. The runners serve as guide members as hereinafter described. The runners are formed of any suitable material such as the angle material shown in the drawing. The runners 34 are secured to the lower side of the bottom portions 16 of the ends 12 by suitable means such as spot welding. The runners are provided with side portions 34b which extend at right angles to the main portion 34a of the runner. The portions 34a extend at right angles to the portions 34b and are secured to the lower side of the bottom portion 16 of the ends 12. The runners are secured to the framework 11 in such a manner that one leg of the angle material depends from the bottom of the tray or extends downwardly in a generally vertical direction, whereas the other leg of the angle material is secured to the bottom portions of the ends and sides as hereinbefore described.

Figure 2:
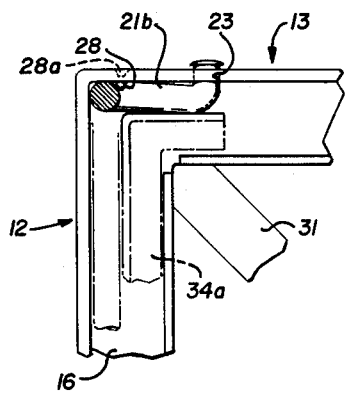
FIGURE 2 is a partial cross-sectional view taken along the line 2—2 of FIGURE 1.

The runner 34 is positioned so that the depending portion is spaced a predetermined distance from the outer extremity of the framework 11 which is slightly greater than the diameter or width of the bail 21, as shown particularly in FIGURES 2 and 4. The portion 34b of the runner 34 is also spaced from the outer extremity of the sides in the same manner as shown particularly in FIGURE 2.

Use of my folding trays may now be briefly described as follows. Let it be assumed that it is desired to stack a plurality of the folding trays with the carrying bails 21 in an upright position. If the bails are not already in an upright position, they can be readily moved to an upright position by merely lifting the bails upwardly and outwardly into engagement with the vertical walls 14 of the ends 12. They are retained in such a position by the abutments 28 and also because of the lever arm provided by the portions 21b. The weight of the bails acting upon this lever arm and urging the bails into engagement with the vertical end walls 14 and the bottom wall portions 16. Movement of the bails to this upright position is facilitated by the fact that the portion 21f rests a substantial distance above the surface of the bottom of the tray so that the hands can be readily slipped under the bails to permit them to be raised.

At the same time that the bails are being moved to an upright position, the tray can be lifted and stacked on top of the tray below so that the runners 34 drop into the right angle recesses 26 provided in the upper ends of the bails 21 of the tray below as shown in FIGURE 4. Seating the runners in this manner prevents longitudinal movement of one tray with respect to the other because the runners 34 engage the portions 21f of the bails 21. Sidewise movement is prevented because the portions 34b of the runners 34 engage the portions 21e of the bails.

Figure 3:
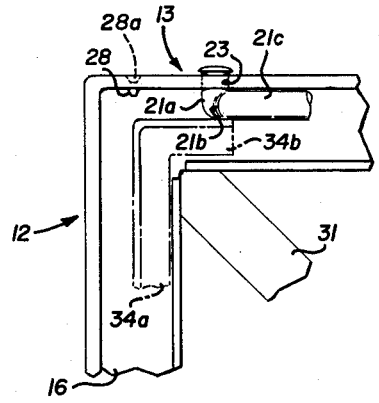
FIGURE 3 is a partial cross-sectional view similar to FIGURE 2 but showing the bail in a folded position.

Now let it be assumed that it is desired to stack the trays with the bails in a folded position. As explained previously, the bails are moved from an upright position to a folded position merely by pushing inwardly on the bails by both hands so that they clear the abutments 28 and come to rest against the bottom of the tray as shown in FIGURES 3 and 6. During the time the bails are being folded, the tray can be placed upon the tray beneath so that the runners 34 seat within the upper extremities of the frame 11 as shown in FIGURE 6. Since the runners seat within the upper extremity of the frame substantial sidewise and lengthwise movement of the upper tray with respect to the lower tray is prevented. It will be noted that the bails 21 when they are in the folded position are in an out-of-the-way position so they do not interfere with the stacking of the trays and the seating of the runners 34 within the upper portion of the framework. With the bales in the folded position, the portions 34b of the runners 34 of the upper tray lie adjacent the portions 21b of the bails of the lower tray as shown in FIGURES 6 and 7 to prevent sidewise movement of the trays.

From the foregoing it can be seen that my folding trays can be readily stacked with the bails in an upright position as well as with the bails in a folded position.

One of the primary advantages of the folding tray which is disclosed in FIGURES 1–7 of the drawings is that it can be utilized in conjunction with a type of bread tray which has been on the market for a number of years under the name of "Deltra" and which is similar to the tray shown in Patent Nos. 2,688,420 and 2,801,766. This tray, as can be seen from the patents and from the drawing of FIGURE 8, is not of the folding type. This conventional tray consists of a rectangular upper rim 41 which is supported above a lower rim 42 by corner members 43. The upper and lower rims 41 and 42 are substantially the same size. The lower rim is provided with a recess 44 on its lower extremity which extends around the perimeter of the lower rim. As can be seen from FIGURE 8, my folding trays can be stacked with the "Deltra" without any difficulty. The recess 44 provided in the lower rim 42 fits within the upper extremities of the bails 21 and in the right angle recesses 26 as shown so that the portions 21f of the bails prevent lengthwise movement and the portions 21e of the bails 21 prevent sidewise movement. The runners 34 on my folding tray stacked above the "Deltra" readily fit within the upper rim 41 of the "Deltra" to prevent lengthwise and sidewise movement of the folding tray with respect to the "Deltra."

The advantages of providing a folding tray which can be nested with conventional bread trays is obvious. For example, bakeries having thousands of the conventional "Deltra" can readily start utilizing the new type of folding trays without discarding the "Deltras" because the "Deltras" can be stacked on the folding trays and vice versa with no difficulty. Thus, a bakery having "Deltras" can continue to use the "Deltras" and, at the same time, when making additional acquisitions or replacements of bread trays, purchase folding trays. Thus, the "Deltras" can be used until they are no longer usable. Use of the folding trays is desirable because of the great saving in space when the bails are in a folded position.

As can be seen from FIGURE 10, liners 51 of a suitable material such as the corrugated cardboard shown can be utilized in the folding trays to thereby make the folding trays particularly adaptable for carrying loaves of bread and the like. The liners 51 are cut in such a manner that the extremities of the same can be readily seated in the groove 17 provided adjacent the bottom portions 16 of the framework 11 so that the liner will be held in place as the tray is shifted about. It is merely necessary to provide rectangular cut-outs 52 in the corners of the liner 51 as shown particularly in FIGURE 10 to accommodate the portions 21b of the bails 21.

If it is desirable to use a tray construction which does not utilize replaceable liners 51, it is possible to provide my folding tray with means which will take the place of the liner 51 and which can be readily washed and cleaned and which will not collect dust, dirt and other particles. Such means can take the form of a grid 54 formed of suitable material such as steel wire. The grid 54 can be constructed in any suitable manner, for example, as shown, it can consist of a single piece of wire secured to one corner of the frame 11 at a suitable point such as point 56 shown in FIGURE 14, by suitable means such as spot welding and then lacing the same back and forth in V-shaped loops 57 as shown particularly in FIGURE 13 and securing the ends of the loops to the frame by suitable means such as spot welding as shown at 58 and then securing the other end of the wire to another corner of the tray in the same manner in which the other end of the wire is secured. Such an arrangement is advantageous because if, for some reason, one of the loops should come loose from the frame, there will be no sharp ends which could cause tearing of the packages or wrapping on the articles carried in the tray. As shown in FIGURE 15, if desired, the spot welding operation can be eliminated and the frame can be crimped as shown at 61 in FIGURE 15 to engage the ends of the loops.

Another embodiment of my folding tray construction is shown in FIGURES 16, 17 and 18. It is very similar to the embodiments hereinbefore described with the exception of several modifications as hereinafter described. The rectangular framework 11 is substantially identical to that used in previous embodiments as shown. The bails utilized have been changed somewhat in that the portions 21c are substantially longer in the embodiment shown in FIGURES 16, 17 and 18 than in the previous embodiments, and the portion 21d is shorter and inclined at a greater angle. The portion 21a of the bail 21 points in a direction 180° removed from the position in which it is shown in the other embodiments. Means is provided for pivotally mounting the bails 21 and journalling the portions 21a on each side of the framework 11 and consists of bearing means in the form of portions 34c which are a part of the runner 34. The portions 34c have been cut away from the runner 34 to form strap-like members which extend through slots 61 provided in the bottom wall portion 16. The strap-like members are bent in a substantially semi-circular form to overlie the bottom wall portion 16 to provide cylindrical recesses which accommodate the portions 21a on the bail. Thus, it can be seen particularly from FIGURE 16 that the portion 34c in combination with the upper surface of the bottom wall portion 16 serves to provide means for rotatably journalling the ends 21a of the bail to permit the bail to be moved from an upright position, as shown in the drawing, to a folded position as described for the other embodiments. Abutment means in the form of projections 28 are provided on the side walls of the framework 11. The projections are positioned as in the hereinbefore described embodiments and are adapted to be engaged by the bails to hold the bails in their upright positions. The bails 21 can be formed of spring steel to facilitate clearing of the projections 28 when moving the bails to their folded positions.

The operation and use of the tray is substantially identical to that hereinbefore described. When the bail is in an upright position, the trays can be seated one above the other as shown in FIGURE 16. When the bails are in a folded position, the trays can be nested in a manner similar to that shown in FIGURE 6.

From FIGURES 16, 17 and 18, it can be seen that the bail can be rotatably mounted in the frame in several different manners within the scope of the present invention. In the embodiment shown in FIGURES 16, 17 and 18, it is merely necessary to provide a runner 34 having a portion 34b which is slightly greater in length than the similar portions shown in the hereinbefore described embodiments. The semi-circular loops formed by the portions 34c in combination with the bottom portions 16 provide means for rigidly supporting the lower extremities of the bails while at the same time providing a better bearing surface for the bails. Also it is not necessary to provide holes in the sides of the rectangular framework 11 as in the other embodiments. The tray shown in FIGURES 16, 17 and 18 is more compact because the portions 21a of the bails do not extend outwardly from the side walls of the tray as in the embodiments hereinbefore described.

It is apparent from the foregoing that I have provided a new and improved folding tray construction which has many advantages over folding trays heretofore provided. The construction is such that the carrying bails may be readily moved between an upright position and a folded position. The construction of the tray is also such that it can be utilized with conventional type bread trays so that it can be readily integrated by users already having conventional type trays.

I claim:
1. In a folding tray construction, a substantially rectangular framework having parallel side walls and parallel end walls, a pair of bails pivotally mounted in the framework at points spaced from the end walls, the bails being substantially U-shaped in form and having first end portions extending in a direction at right angles to the side walls journalled in the framework, second, third, fourth and fifth portions on opposite ends of each of the bails and lying in a plane generally parallel to the plane of the vertical side walls, the second portions when the bail is in an upright position being substantially horizontal, the third portions being substantially vertical, the fourth portions being inclined inwardly away from the adjacent end walls of the framework and the fifth portions extending outwardly toward the adjacent end walls of the framework, each bail also including another interconnecting portion extending in a direction at right angles to the vertical side walls, and runners formed on the lower extremities of the framework and adapted to seat within the upper ends of the bails of a tray below when the trays are stacked one above the other with the bails in an upright position.

2. A folding tray construction as in claim 1 wherein said first end portions are journalled in the side walls of the framework.

3. A folding tray construction as in claim 1 wherein said runners are formed to provide means for journalling the first end portions at points spaced from the side and end walls of the framework.

4. A folding tray construction as in claim 1 wherein a metal grid is mounted in the lower extremity of the tray.

5. A folding tray construction as in claim 4 wherein the metal grid consists of a single length of wire formed into loops and fixed to the framework of the tray.

6. A folding tray construction as in claim 1 together with a liner mounted in the tray.

7. In a folding tray construction, a rectangular framework having two spaced parallel substantially vertical side walls and two spaced parallel substantially vertical end walls, said framework also having a bottom wall portion extending around the framework, a pair of spaced bails pivotally mounted in the framework adjacent two of said spaced parallel walls for movement toward and away from the adjacent walls between upright and folded positions, the upper extremities of the bails being formed to provide recesses overlying the frame when the bails are in an upright position and which extend substantially the entire length of the adjacent walls, and runners mounted on the frame on the bottom side thereof, the runners being adapted for seating within the recesses of the bails of a tray below when the trays are stacked one above the other with the bails in an upright position, said runners being adapted to seat within the framework of a tray below when the trays are stacked one above the other with the bails in a folded position, said bails in a folded position forming runner receiving recesses between the bails and said adjacent parallel walls to receive said runners.

8. In a folding tray construction, a rectangular framework having opposed parallel substantially vertical side wall portions and opposed parallel substantially vertical end wall portions, said framework also having a bottom wall portion extending around the framework, a pair of spaced bails pivotally mounted on the framework adjacent opposed wall portions for movement toward and away from adjacent wall portions between upright and folded positions, the upper extremities of the bails being formed with retaining portions substantially directly over the outer edge of said framework when said bails are in upright position, and elongated runners extending downwardly from the bottom of said bottom wall portion parallel to and generally below said bails, said runners being spaced inwardly of but adjacent the vertical plane containing said retaining portions when said bails are upright whereby one of said trays may be supported by the upright bails of a similar tray therebelow by positioning said one tray with its runners inwardly of said retaining portions of the bails of the tray therebelow to be held thereby against lateral movement.

9. A folding tray as defined in claim 8 wherein said runners are of a length less than the corresponding transverse dimension of said framework whereby said tray may be selectively stacked on a non-collapsible tray of similar size by engaging said runners within the edges of said non-collapsible tray.

10. A folding tray as defined in claim 8 wherein said retaining portions of said bails extend the full length of said bails.

References Cited in the file of this patent
UNITED STATES PATENTS

| | | |
|---|---|---|
| 1,630,471 | Collins | May 31, 1927 |
| 2,660,328 | Averill | Nov. 24, 1953 |
| 2,781,936 | Bitney | Feb. 19, 1957 |
| 2,994,463 | Drader | Aug. 1, 1961 |